4,325,608

United States Patent [19]
Kamiya et al.

[11] 4,325,608
[45] Apr. 20, 1982

[54] OPTICAL SYSTEM OF A COPYING MACHINE

[75] Inventors: Osamu Kamiya, Machida; Nobuyuki Sekimura, Yokohama, both of Japan

[73] Assignee: Canon Kabushiki Kaisha, Tokyo, Japan

[21] Appl. No.: 92,509

[22] Filed: Nov. 8, 1979

[30] Foreign Application Priority Data

Nov. 10, 1978 [JP] Japan .................. 53/138442

[51] Int. Cl.³ ............................ G02B 1/10; G02B 5/28
[52] U.S. Cl. ........................................ 350/165; 350/166
[58] Field of Search .................. 350/1.6, 1.7, 164–166

[56] References Cited
U.S. PATENT DOCUMENTS

| | | | |
|---|---|---|---|
| 3,143,921 | 8/1964 | Russell | 355/71 X |
| 3,594,160 | 7/1971 | Gunto et al. | 355/67 X |
| 4,218,134 | 8/1980 | Kamiya et al. | 350/165 |

FOREIGN PATENT DOCUMENTS 2350281  4/1975  Fed. Rep. of Germany ........ 355/71

60142  5/1977  Japan ................................... 355/71

OTHER PUBLICATIONS

I.B.M. Technical Disclosure Bulletin, vol. 15, No. 2, Jul. 1972, p. 522.

Primary Examiner—John K. Corbin
Assistant Examiner—Bruce Y. Arnold
Attorney, Agent, or Firm—Fitzpatrick, Cella, Harper & Scinto

[57] ABSTRACT

In a copying machine including a halogen lamp, a CdS photosensitive medium and a transmitting type projection lens system, a 5-layer or 7-layer multi-layered interference film comprising a dielectric material is applied to a surface of the transmitting type projection lens system so that a spectral distribution comprising the spectral wavelength characteristic of the original light, the spectral transmission characteristic of the multi-layered interference film and the spectral sensitivity characteristic of the photosensitive medium superposed one upon another becomes a uniform distribution.

9 Claims, 8 Drawing Figures

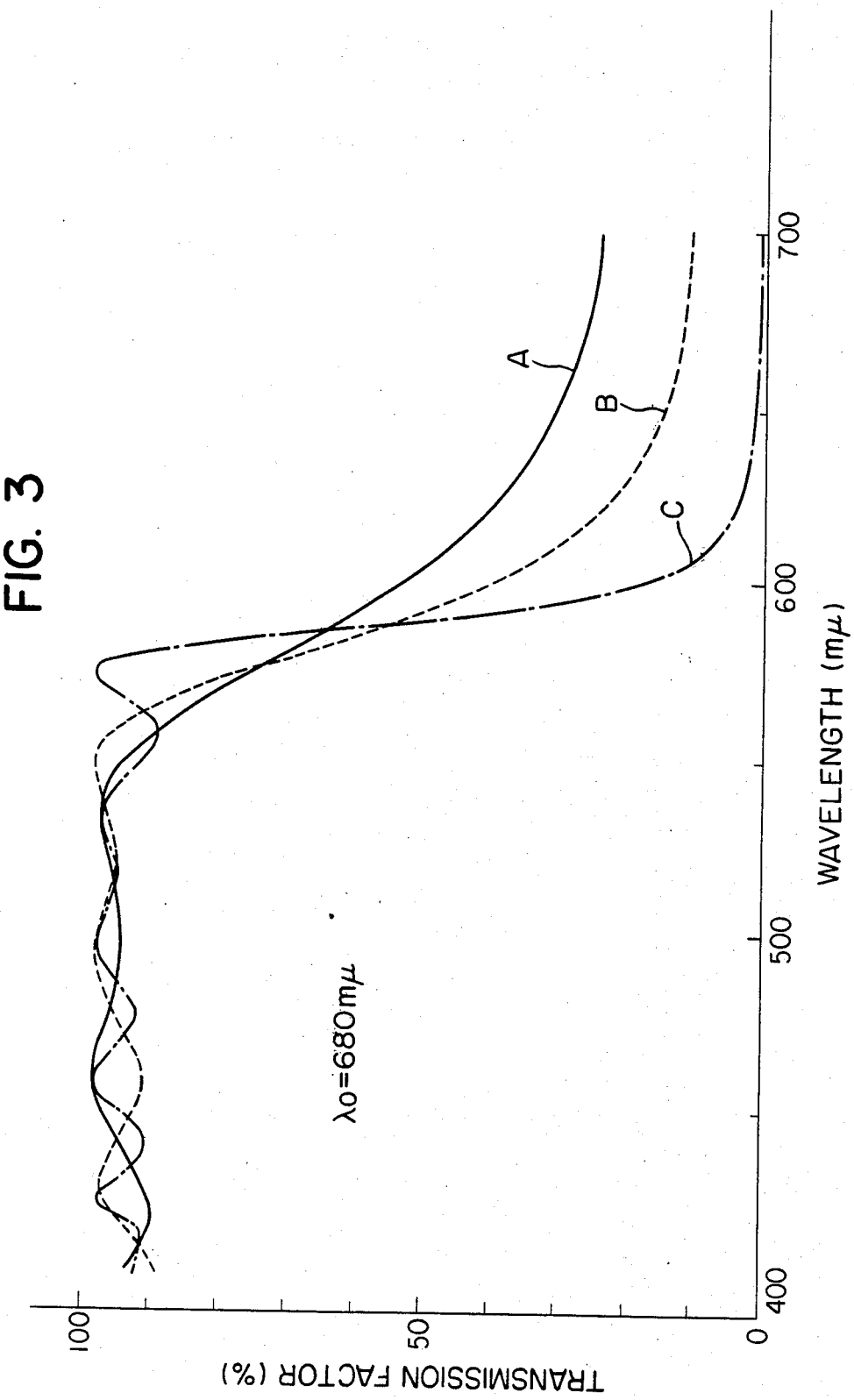

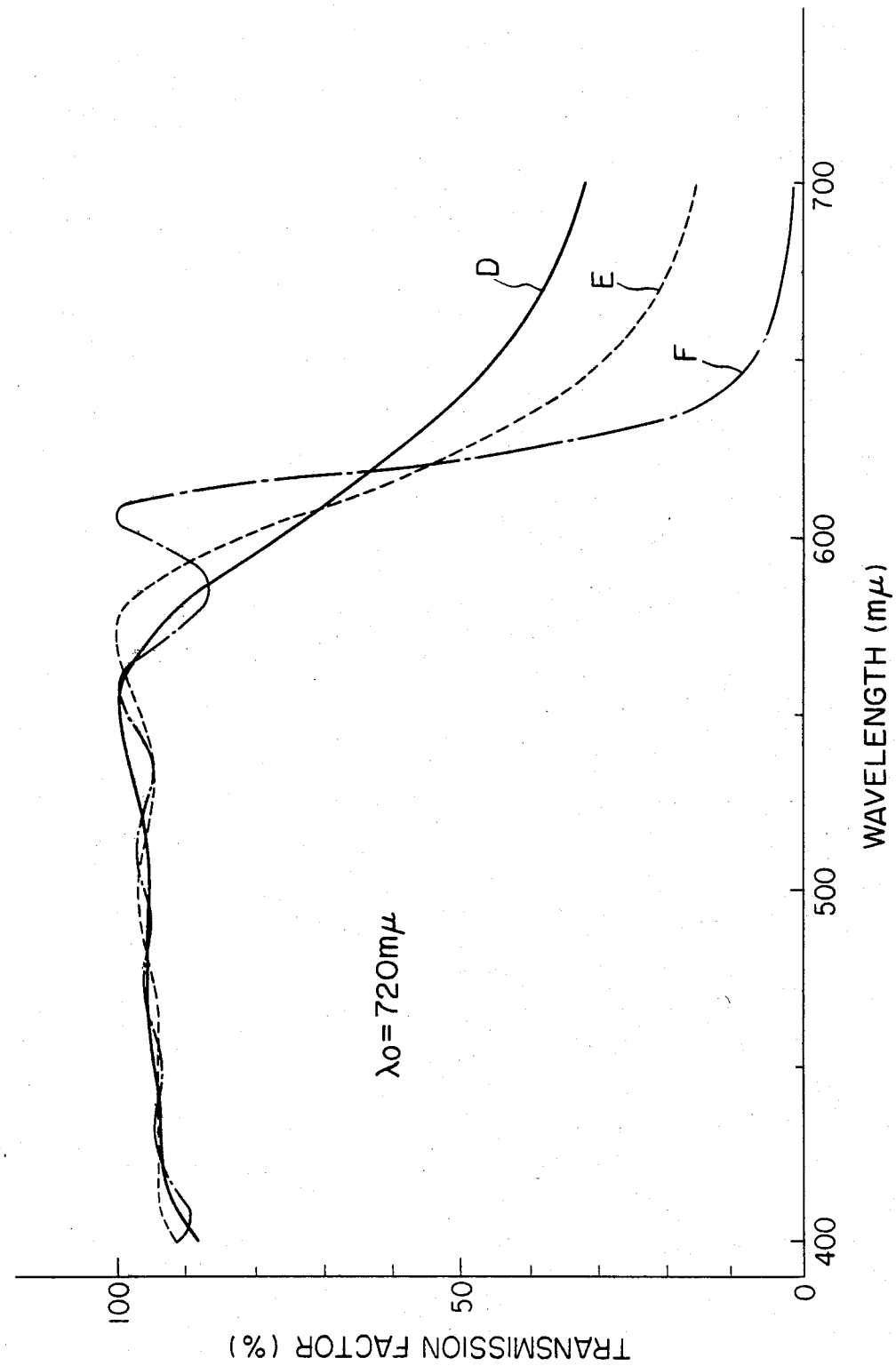

OPTICAL SYSTEM OF A COPYING MACHINE

BACKGROUND OF THE INVENTION

1. Field of the Invention

This invention relates to an optical system of a copying machine, and more particularly to an optical system of a copying machine in which a multi-layered interference film for adapting the spectral wavelength characteristic of an original light to the spectral sensitivity characteristic of a photosensitive medium is applied to a surface of a transmitting type lens system.

2. Description of the Prior Art

As described in our prior Application Ser. No. 964,986, now U.S. Pat. No. 4,218,134, which discloses a multi-layered interference film provided on a reflecting type projection lens, if, for example, a halogen lamp as a light source and a CdS photosensitive medium as a photosensitive medium are used in the optical system of a copying machine (in the present specification, the light source and the photosensitive medium with the other optical members are referred to as the optical system for the sake of convenience), red characters or figures depicted on an original are copied only thinly or not at all. Such phenomenon occurs because, at the filament temperature of about 3000° C. usually used when a halogen lamp is used, the light-emission energy thereof has a maximum value in the infrared range of 800–900 mµ and is uniformly decreased toward the short wavelength side, and the spectral sensitivity of the CdS photosensitive medium is higher in the red to near-infrared, with a result that the exposure of red portions becomes excessive as compared with the exposure of blue or green characters or figures on the original. When non-conformity so occurs between the wavelength characteristic of the object light and the sensitivity characteristic of the photosensitive medium, it is usual to dispose a filter in or adjacent to an image forming lens and cut the unnecessary wavelength range, but in an apparatus wherein no filter is removably mounted, it is also possible that the thin film provided on the substrate of the filter is directly applied to a surface of the image forming lens. For such thin film, an interference thin film which readily provides the desired characteristic has been widely used. However, if a multi-layered interference thin film having a property similar to that of the color resolving dichroic mirror of a color television camera or the cold mirror used in an illuminating system is applied to a surface of the projection lens so that light of necessary wavelength is transmitted therethrough while light of unnecessary wavelength is reflected and eliminated thereby, the transmission factor and copying performance may be maintained, whereas a preferred result has not been obtained when an experiment has been carried out by using a multi-layered interference thin film in which the center wavelength of the conventional dichroic mirror has been moved. Through the examination of this experiment, problems in the spectral transmission factor characteristic of the multi-layered interference film in a transmitting type lens system have been extracted as follows:

(1) If red light of 550 mµ or more, which is an unnecessary wavelength, is sharply cut, the contrast of red is enhanced but the contrast of blue, green or cyanic color is reduced. This is a point asserted in a multi-layered film having thirteen layers as disclosed, for example, in Japanese Laid-open Patent Application No. 60142/1977.

(2) Any multi-layered film which does not have an average transmission factor of at least 70% for blue and green lights which are in the wavelength range of 400 mµ to 500 mµ is unsuitable.

(3) The transmission factor for red and infrared lights which are in the wavelength range of 600 mµ to 800 mµ should desirably be 50% or less, but too low a transmission factor for these lights would cause reduced reproducibility of blue and cyanic colors.

Japanese Laid-open Patent Application No. 39146/1978 suggests attachment of a wavelength-selective transmitting film to a surface of a transmitting type projection lens but does not disclose the concrete construction of such film.

SUMMARY OF THE INVENTION

It is an object of the present invention to provide an optical system of a copying machine having a light source such as a halogen lamp, a photosensitive medium of CdS or like substance, and a transmitting type projection lens system, said optical system having a multi-layered interference thin film for suppressing the amount of exposure of red light without decreasing blue and green lights to thereby ensure copies having a good contrast for all colors.

Such an object is achieved by depositing on a surface of a transmitting type projection lens system, by vaporization, a multi-layered interference thin film consisting of alternately layered high and low refractive index layers whose basic optical thickness is ¼ of design wavelength, in particular, a 5-layer or 7-layer multi-layered interference thin film, two of said layers which are adjacent to the substrate and one of said layers which is adjacent to the air being adjusting layers.

The invention will become fully apparent from the following detailed description thereof taken in conjunction with the accompanying drawings.

BRIEF DESCRIPTION OF THE DRAWINGS

FIGS. 3 and 4 are graphs illustrating spectral transmission factor curves.

DESCRIPTION OF THE PREFERRED EMBODIMENTS

Figure 1:
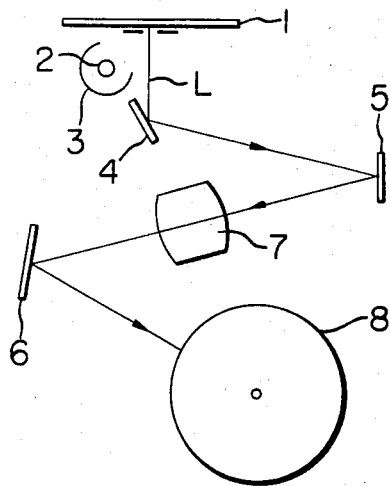
FIG. 1 is a schematic view of an optical system of a copying machine.

FIG. 1 includes an original 1, a halogen lamp 2, a condensing mirror 3, mirrors 4, 5, 6 for bending the light path, a transmitting type lens 7 and a photo-sensitive drum 8 provided with a CdS photosensitive medium. The light beam emitted from the lamp 2 is condensed by the condensing mirror 3 and illuminates the original 1, so that the original light L scattered and reflected by the surface of the original is reflected by the mirrors 4 and 5 in succession, refracted and converged by the projection lens 7 and reflected by the mirror 6, whereafter the light is formed as a linear image on the photosensitive drum 8.

Figure 2A:
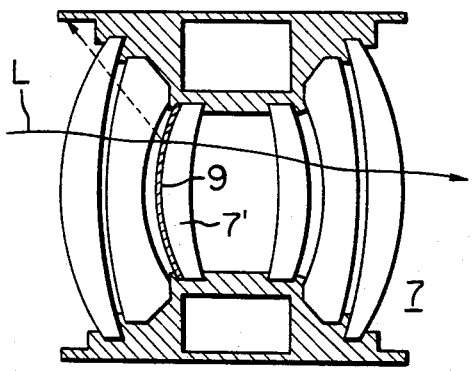
FIGS. 2(A) and (B) illustrate systems in which a multi-layered interference thin film is deposited by vaporization on the convex surface of a transmitting type lens system.
Figure 2B:
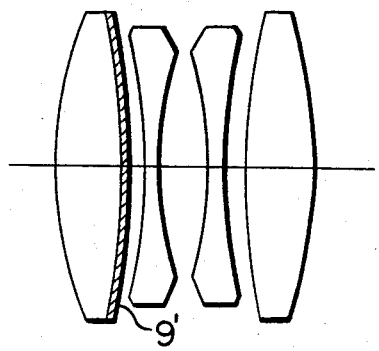

A multi-layered interference thin film 9 is deposited by vaporization on the original side convex surface of a positive meniscus lens 7' disposed centrally of the projection lens of FIG. 2(A). The construction of this interference thin film will later be described in detail. The light of unnecessary wavelength range reflected by the film is absorbed by a black coating material applied to the inner wall of the lens barrel, the outer peripheral surface of the lens or the other light-intercepting portion. If the lens surface on which the thin film is deposited by vaporization is a convex surface, the unnecessary light reflected by the thin film is condensed by a concave surface, whereafter the light is again reflected elsewhere and is prevented from providing a ghost or a flare. On the other hand, if the lens surface on which the thin film is deposited by vaporization is a concave surface, a uniform film thickness may not be provided and generally the performance of the thin film will not be varied as much and, therefore, a less sharp curvature for the lens surface is preferred and a smaller diameter of the lens is advantageous for manufacturing purposes. In FIG. 2(A), the thin film is deposited by vaporization on the convex surface of the lens which faces the central space of a symmetrical type lens. Likewise, FIG. 2(B) shows a system in which a multi-layered interference thin film 9' is deposited by vaporization on the convex surface of another lens system.

Description will now be made of the multi-layered interference thin film. In the embodiments shown in Tables 1 and 2, $MgF_2$ (whose refractive index $N=1.38$) may be used as a low refractive index layer $N_L$ and numerous film materials may be used as a high refractive index layer $N_H$ but a material having a refractive index of 2.00–2.35 such as $TiO_2$ or $ZrO_2$ has been used in particular. The spectral characteristics of the multi-layered interference thin films of Tables 1 and 2 are shown in FIGS. 3 and 4, respectively. The asterisks (*) in Tables 1 and 2 represent the refractive index of $TiO_2$, which may be expressed by the following equation for the wavelength $\lambda$.

$$n = 2.07 + 11/\lambda - 318$$

It is also to be understood that the film thickness is represented at the rate for a design wavelength $\lambda_o$, which is substantially the center wavelength of the reflecting zone for suppressing the transmission.

Each layer has an optical film thickness equal to $\frac{1}{4}$ of the design wavelength $\lambda_o$, which basically provides substantially the center of a high transmission zone, and an exact design wavelength must be adjusted in accordance with the radiation energy characteristic of the light source and the spectral sensitivity characteristic of the photosensitive medium, but when the film thickness of each layer is to be determined, a wavelength within the range of 600 m$\mu$–800 m$\mu$ is adopted.

Further, the film thickness is adjusted so as to improve the performance in the transmitting zone by two layers adjacent to the substrate and one layer adjacent to the air. It has heretofore been practised to adjust the film thickness of one layer adjacent to the substrate and one layer adjacent to the air in order to prevent a fine variation, namely, a so-called ripple, of the spectral characteristic of a multi-layered dichroic mirror film, but in this embodiment, the two layers adjacent to the substrate are adjusted to thicknesses greater by 9–15% than the basic film thickness in order to improve the transmission factor of the transmitting zone. In that case, if the total number of layers is k and the optical film thickness of the ith layer from the substrate is $ND_i$, then the thickness of each film is expressed as $$ND_1 = ND_k > ND_2 > ND_3 = ND_4 = \ldots = ND_{k-1}$$

Figure 5:
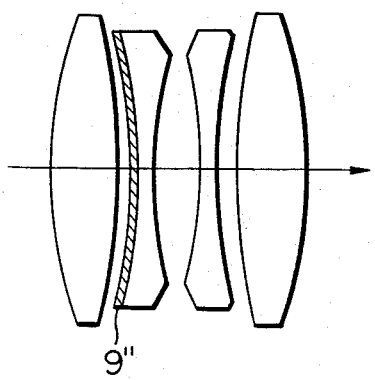
FIG. 5 illustrates a system in which a multi-layered interference thin film is deposited by vaporization on the concave surface of a transmitting type lens system.
Figure 5A:
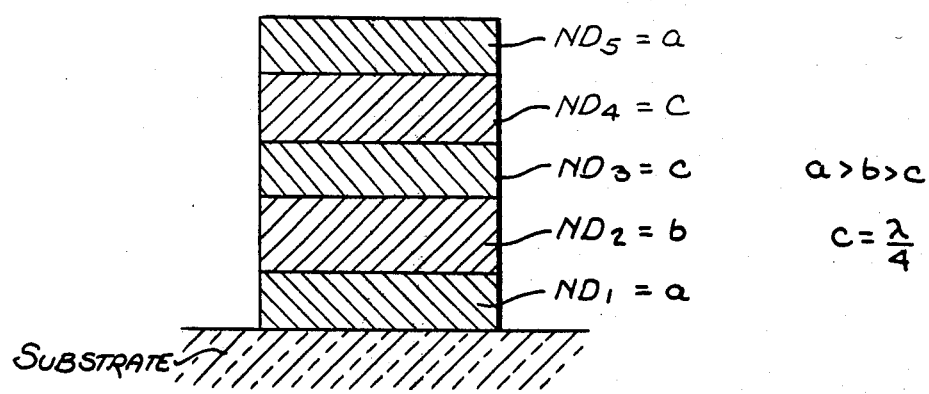
FIGS. 5A and 5B illustrate 5-layer and 7-layer thin films, respectively, for use shown in FIG. 5.
Figure 5B:
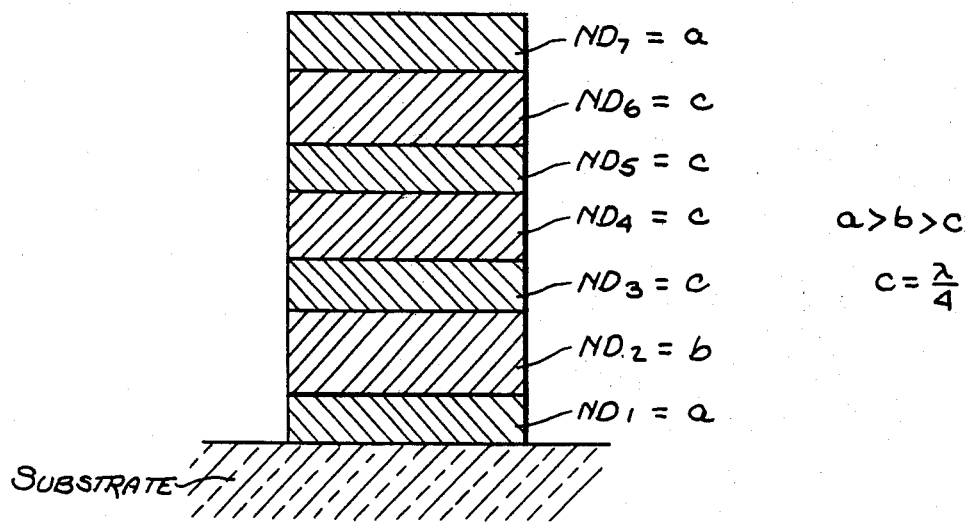

The relationships for 5-layer and 7-layer films, according to this expression, are shown in FIGS. 5A and 7A, respectively. The adjusting layers may be two layers adjacent to the substrate and one layer adjacent to the air, or one layer adjacent to the substrate and two layers adjacent to the air.

The film construction design values shown in Table 1 are those of an example in which film is applied to a lens material $BK_7$ and in this example, the film comprises alternate layers of $TiO_2$ and $MgF_2$ starting from a high refractive index layer. A in FIG. 3 shows the spectral transmission factor curve of a 5-layer film, B in FIG. 3 shows that of a 7-layer film, and C in FIG. 3 shows that of a 13-layer film. Also, the film construction design values shown in Table 2 are those of an example in which film is applied to a lens material LaSF03. D in FIG. 4 shows the spectral transmission factor curve of a 5-layer film, E in FIG. 4 shows that of a 7-layer film and F in FIG. 4 shows that of a 13-layer film.

As seen from the tendencies of the curves appearing in FIGS. 3 and 4, a smaller number of layers results in an increased transmission factor of the long wavelength range, namely, a decreased reflection factor of unnecessary light and thus, it may be said that a greater number of layers is desirable in order to eliminate the unnecessary light. However, if the number of layers is increased, the wavelength separating portion of the curves will approach verticalness and a very sharp cut-off characteristic will appear in the 13-layer or 15-layer interference thin film as shown by C in FIG. 3 or F in FIG. 4 which is used in the recent dichroic mirror or cold mirror and therefore, the contrast to blue, green or cyanic color is reduced as has been discussed with respect to the objects of the present invention.

Accordingly, in the present invention, the number of layers is selected such that the transmission factor is gradually reduced from the ranges of blue, green and cyanic colors to the range of red, or straightforwardly speaking, such that the curve of the wavelength separating portion has a gradient. In the case of an odd number of layers greater than 7, a problem occurs in the copying of all colors and in the case of a number of layers less than 5, there is a disadvantage that the transmission factor of the unnecessary wavelength range is high. Therefore, five or seven layers has been selected in the present invention. Adding a layer thereto to make an even number of layers should be avoided because this does not contribute to an improved performance in spite of the increased trouble of manufacture. It is also possible to apply films to a plurality of lens surfaces and thereby superpose the actions one upon another, but often one layer suffices.

Description has been made of depositing a multi-layered interference film on the convex surface of a lens by vaporization, but by intactly using the data of Tables 1 and 2 to deposit a multi-layered interference film on the concave surface of the lens of FIG. 2(A) or 2(B), it is possible to make an optical system of a copying machine which provides as good a contrast over all colors as that provided when the film is deposited on the convex surface of the lens. FIG. 5 shows a system in which a multi-layered interference thin film 9″ is deposited by vaporization on the convex surface of the lens system of FIG. 2(B).

According to the present invention, as has hitherto been described, a multi-layered interference thin film of a predetermined construction is applied to a surface of the lens disposed in a light path leading from the original to the photosensitive medium, whereby it is possible to effectively copy all colors of the original except the colors which are hard to copy.

TABLE 1

$\lambda_o = 680$ mμ
5-layer film (A in FIG. 3)

|  |  | Refractive index | Optical thickness |
|---|---|---|---|
| Substrate | $N_S$ | 1.52 | — |
| 1st layer | $N_H$ | * | 0.287 |
| 2nd layer | $N_L$ | 1.38 | 0.275 |
| 3rd layer | $N_H$ | * | 0.25 |
| 4th layer | $N_L$ | 1.38 | 0.25 |
| 5th layer | $N_H$ | * | 0.287 |
| Air | $N_O$ | 1.00 | — |

7-layer film (B in FIG. 3)

|  |  | Refractive index | Optical thickness |
|---|---|---|---|
| Substrate | $N_S$ | 1.52 | — |
| 1st layer | $N_H$ | * | 0.288 |
| 2nd layer | $N_L$ | 1.38 | 0.275 |
| 3rd layer | $N_H$ | * | 0.25 |
| 4th layer | $N_L$ | 1.38 | 0.25 |
| 5th layer | $N_H$ | * | 0.25 |
| 6th layer | $N_L$ | 1.38 | 0.25 |
| 7th layer | $N_H$ | * | 0.288 |
| Air | $N_O$ | 1.00 | — |

13-layer film (C in FIG. 3)

|  |  | Refractive index | Optical thickness |
|---|---|---|---|
| Substrate | $N_S$ | 1.52 | — |
| 1st layer | $N_H$ | * | 0.287 |
| 2nd layer | $N_L$ | 1.38 | 0.275 |
| 3rd layer | $N_H$ | * | 0.25 |
| 4th layer | $N_L$ | 1.38 | 0.25 |
| 5th layer | $N_H$ | * | 0.25 |
| 6th layer | $N_L$ | 1.38 | 0.25 |
| 7th layer | $N_H$ | * | 0.25 |
| 8th layer | $N_L$ | 1.38 | 0.25 |
| 9th layer | $N_H$ | * | 0.25 |
| 10th layer | $N_L$ | 1.38 | 0.25 |
| 11th layer | $N_H$ | * | 0.25 |
| 12th layer | $N_L$ | 1.38 | 0.25 |
| 13th layer | $N_H$ | * | 0.287 |
| Air | $N_O$ | 1.00 | — |

TABLE 2

$\lambda_o = 720$ mμ
5-layer film (D in FIG. 4)

|  |  | Refractive index | Optical thickness |
|---|---|---|---|
| Substrate | $N_S$ | 1.80 | — |
| 1st layer | $N_H$ | * | 0.287 |
| 2nd layer | $N_L$ | 1.38 | 0.275 |
| 3rd layer | $N_H$ | * | 0.25 |
| 4th layer | $N_L$ | 1.38 | 0.25 |
| 5th layer | $N_H$ | * | 0.287 |
| Air | $N_O$ | 1.00 | — |

7-layer film (E in FIG. 4)

|  |  | Refractive index | Optical thickness |
|---|---|---|---|
| Substrate | $N_S$ | 1.80 | — |
| 1st layer | $N_H$ | * | 0.287 |
| 2nd layer | $N_L$ | 1.38 | 0.275 |
| 3rd layer | $N_H$ | * | 0.25 |
| 4th layer | $N_L$ | 1.38 | 0.25 |
| 5th layer | $N_H$ | * | 0.25 |

TABLE 2-continued

| 6th layer | $N_L$ | 1.38 | 0.25 |
|---|---|---|---|
| 7th layer | $N_H$ | * | 0.287 |
| Air | $N_O$ | 1.00 | — |

13-layer film (F in FIG. 4)

|  |  | Refractive index | Optical thickness |
|---|---|---|---|
| Substrate | $N_S$ | 1.80 | — |
| 1st layer | $N_H$ | * | 0.287 |
| 2nd layer | $N_L$ | 1.38 | 0.275 |
| 3rd layer | $N_H$ | * | 0.25 |
| 4th layer | $N_L$ | 1.38 | 0.25 |
| 5th layer | $N_H$ | * | 0.25 |
| 6th layer | $N_L$ | 1.38 | 0.25 |
| 7th layer | $N_H$ | * | 0.25 |
| 8th layer | $N_L$ | 1.38 | 0.25 |
| 9th layer | $N_H$ | * | 0.25 |
| 10th layer | $N_L$ | 1.38 | 0.25 |
| 11th layer | $N_H$ | * | 0.25 |
| 12th layer | $N_L$ | 1.38 | 0.25 |
| 13th layer | $N_H$ | * | 0.287 |
| Air | $N_O$ | 1.00 | — |

What we claim is:

1. An optical system for use in a copier comprising:
   a lamp for illuminating an original;
   a Cds photosensitive member; and
   a transmitting type projection lens system comprising a lens surface including a multi-layered interference coating formed on a substrate, said interference coating being a 5- or 7-layered structure composed of alternately superposed high refractive layers and low-refractive layers each having a basic optical thickness equal to ¼ of a design wavelength $\lambda_o$ and, including therein, two and one adjusting layers at the substrate side and the air side, respectively, of said coating to prevent transmission in the near-infrared wavelength region to thereby match the spectral characteristics of the light reflected from an original with the spectral sensitivity of said photosensitive member, wherein the optical thickness $ND_i$ of an ith layer (from 1 to k), counted from the substrate side, satisfies the following relation:

$$ND_1 = ND_k > ND_2 > ND_3 = ND_4 = ND_{k-1}$$

where k represents the number of layers of said multi-layered interference coating.

2. The optical system according to claim 1, wherein said multi-layered interference coating is applied to the convex surface of said transmitting type projection lens comprising a plurality of lens elements providing internal convex and/or concave surfaces.

3. The optical system according to claim 1, wherein said multi-layered interference coating is applied to the concave surface of said transmitting type projection lens comprising a plurality of lens elements providing internal convex and/or concave surfaces.

4. The optical system according to claim 1, wherein said transmitting type projection lens is of the symmetrical type and said multi-layered interference coating is applied to the surface of said lens which faces the center of said lens system.

5. The optical system according to claim 1, wherein said design wavelength $\lambda_o$ is 680 mμ to 720 mμ.

6. The optical system according to claim 1, wherein said multi-layered interference coating is characterized by the following data:

|  | Refractive index | Thickness ND/$\lambda_o$ |
|---|---|---|
| Substrate | 1.52 | — |
| Layer 1 | $n_1$ | 0.287 |
| 2 | 1.38 | 0.275 |
| 3 | $n_1$ | 0.25 |
| 4 | 1.38 | 0.25 |
| 5 | $n_1$ | 0.287 |
| Air | 1.00 | — | where
$\lambda_o = 680$ m$\mu$
$n_1 = 2.07 + 11/\lambda - 318$
for the wavelength $\lambda$.

7. The optical system according to claim 1, wherein said multi-layered interference coating is characterized by the following data:

|  | Refractive index | Thickness ND/$\lambda_o$ |
|---|---|---|
| Substrate | 1.80 | — |
| Layer 1 | $n_2$ | 0.287 |
| 2 | 1.38 | 0.275 |
| 3 | $n_2$ | 0.25 |
| 4 | 1.38 | 0.25 |
| 5 | $n_2$ | 0.287 |
| Air | 1.00 | — | where
$\lambda_o = 720$ m$\mu$
$n_2 = 2.07 + 11/\lambda - 318$
for the wavelength $\lambda$.

8. The optical system according to claim 1, wherein said multi-layered interference coating is characterized by the following data:

|  | Refractive index | Thickness ND/$\lambda_o$ |
|---|---|---|
| Substrate | 1.52 | — |
| Layer 1 | $n_1$ | 0.288 |
| 2 | 1.38 | 0.275 |
| 3 | $n_1$ | 0.25 |
| 4 | 1.38 | 0.25 |
| 5 | $n_1$ | 0.25 |
| 6 | 1.38 | 0.25 |
| 7 | $n_1$ | 0.288 |
| Air | 1.00 | — | where
$\lambda_o = 680$ m$\mu$
$n_1 = 2.07 + 11/\lambda - 318$
for the wavelength $\lambda$.

9. The optical system according to claim 1, wherein said multi-layered interference coating is characterized by the following data:

|  | Refractive index | Thickness ND/$\lambda_o$ |
|---|---|---|
| Substrate | 1.80 | — |
| Layer 1 | $n_2$ | 0.287 |
| 2 | 1.38 | 0.275 |
| 3 | $n_2$ | 0.25 |
| 4 | 1.38 | 0.25 |
| 5 | $n_2$ | 0.25 |
| 6 | 1.38 | 0.25 |
| 7 | $n_2$ | 0.287 |
| Air | 1.00 | — | where
$\lambda_o = 720$ m$\mu$
$n_2 = 2.07 + 11/\lambda - 318$
for the wavelength $\lambda$.

* * * * *